(12) United States Patent
Karam et al.

(10) Patent No.: US 9,952,358 B2
(45) Date of Patent: Apr. 24, 2018

(54) METHOD TO PREVENT EMULSION IN A LIQUID LENS

(71) Applicant: CORNING INCORPORATED, Corning, NY (US)

(72) Inventors: Raymond Miller Karam, Santa Barbara, CA (US); Vijay Albuquerque, Santa Barbara, CA (US); Georges Roussos, San Jose, CA (US); Amy Andersen, Santa Barbara, CA (US); John Koons, Santa Barbara, CA (US); Brian Nilsen, Santa Barbara, CA (US); Rob Hobden, Santa Barbara, CA (US); Tony Chobot, Galeta, CA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 14/824,945

(22) Filed: Aug. 12, 2015

(65) Prior Publication Data

US 2016/0299264 A1      Oct. 13, 2016

Related U.S. Application Data

(60) Provisional application No. 62/146,244, filed on Apr. 11, 2015.

(51) Int. Cl.
*G02B 3/12* (2006.01)
*G02B 3/14* (2006.01)
*G02B 26/00* (2006.01)

(52) U.S. Cl.
CPC .............. *G02B 3/14* (2013.01); *G02B 3/12* (2013.01); *G02B 26/005* (2013.01)

(58) Field of Classification Search
CPC .......... G02B 3/12; G02B 3/14; G02B 26/005; G02B 26/004; G02B 1/06
USPC .................................................. 359/665–667
See application file for complete search history.

(56) References Cited

U.S. PATENT DOCUMENTS

| RE39,874 E | 10/2007 | Berge et al. |
| 7,311,398 B2 | 12/2007 | Kuiper et al. |
| 7,443,596 B1 | 10/2008 | Berge |
| 7,573,646 B2 | 8/2009 | Craen et al. |
| 8,260,129 B2 | 9/2012 | Craen et al. |
| 2008/0100905 A1 | 5/2008 | Kato et al. |
| 2010/0271709 A1* | 10/2010 | Takai ............ G02B 3/14 359/665 |

(Continued)

FOREIGN PATENT DOCUMENTS

WO    2007058451 A1    5/2007

*Primary Examiner* — Jordan Schwartz (57) ABSTRACT

Embodiments generally relate to methods for preventing the formation of an emulsion in a liquid lens. In one embodiment, the method comprises fabricating a top substrate, a bottom substrate, and a central substrate including a cavity configured to be filled by first and second liquids. The liquid lens comprising the top substrate, the bottom substrate and the central substrate is assembled, with at least one of the top substrate and the bottom substrate in the assembled liquid lens being characterized by a stabilizing feature determining that in response to an impact load on the assembled liquid lens that would cause localized pressure drops of maximum magnitude X in the absence of the stabilizing feature, the maximum magnitude of localized pressure drops within the liquid lens is smaller than X.

24 Claims, 7 Drawing Sheets

(56) References Cited

U.S. PATENT DOCUMENTS

| | | | | |
|---|---|---|---|---|
| 2012/0081795 A1* | 4/2012 | Choi | ............ | G02B 3/14 |
| | | | | 359/665 |
| 2012/0105971 A1* | 5/2012 | Lee | ............ | G02B 7/028 |
| | | | | 359/665 |
| 2012/0113525 A1* | 5/2012 | Kong | ............ | G02B 26/004 |
| | | | | 359/665 |
| 2012/0150292 A1* | 6/2012 | Mentak | ............ | A61F 2/1635 |
| | | | | 623/6.37 |
| 2012/0275030 A1* | 11/2012 | Kong | ............ | H04N 5/2254 |
| | | | | 359/665 |
| 2013/0301105 A1* | 11/2013 | Kim | ............ | G02B 26/005 |
| | | | | 359/290 |
| 2014/0221753 A1* | 8/2014 | Tearney | ............ | A61B 1/0019 |
| | | | | 600/167 |
| 2014/0240586 A1* | 8/2014 | Lee | ............ | H04N 5/238 |
| | | | | 348/362 |
| 2014/0293395 A1* | 10/2014 | Hendriks | ............ | G02B 26/005 |
| | | | | 359/290 |
| 2014/0328999 A1* | 11/2014 | Aizenberg | ............ | A61L 27/56 |
| | | | | 427/2.26 |
| 2014/0347741 A1* | 11/2014 | Karam | ............ | G02B 3/0012 |
| | | | | 359/665 |

* cited by examiner

METHOD TO PREVENT EMULSION IN A LIQUID LENS

RELATED APPLICATIONS

This application is related to U.S. application Ser. No. 14/535,706, filed Nov. 7, 2014, which is a Divisional Application of U.S. application Ser. No. 13/902,766, filed May 24, 2013, and granted as U.S. Pat. No. 8,922,901, both of which applications are incorporated herein in their entirety by reference. This application claims priority from U.S. Provisional Patent Application Ser. No. 62/146,244, entitled "Method to prevent emulsion in a liquid lens", filed on Apr. 11, 2015, which is hereby incorporated by reference as if set forth in full in this application for all purposes.

BACKGROUND

If a mixture of two liquids, neither of which is miscible or soluble in the other, is vigorously stirred or shaken, an emulsion—defined as a fine dispersion of minute droplets of one of the liquids in the other—may form. A transmissive liquid lens encloses two immiscible fluids, one polar and one non-polar, each characterized by a different index of refraction, within a housing. The housing incorporates electrodes by which the shape of the liquid lens, and therefore its optical power, may be manipulated based on the principles of electro-wetting. If such a lens is subjected to impact or shock loads, for example due to the impact of the lens or a device including the lens being dropped, large accelerations may occur, resulting in localized pressure drops within the lens, which may in turn cause the liquids to emulsify. Factors thought to play significant roles in determining whether emulsification will occur in response to localized pressure drops include the magnitudes of the acceleration-induced local body forces, liquid flow parameters, vapor pressures, and surface tension. In some cases, cavitation may even occur, increasing the likelihood of emulsification. In any event, the formation of an emulsion in a liquid lens is deeply undesirable, as it will negatively impact the optical performance of the lens.

It is therefore desirable to provide a method for preventing the formation of an emulsion in a liquid lens in response to an impact or shock load.

SUMMARY

The present invention includes a method for preventing the formation of an emulsion in a liquid lens. The method comprises fabricating a top substrate, a bottom substrate, and a central substrate including a cavity configured to be filled by first and second liquids. The method further comprises assembling the liquid lens comprising the top substrate, the bottom substrate and the central substrate, wherein at least one of the top substrate and the bottom substrate in the assembled liquid lens is characterized by a stabilizing feature determining that in response to an impact load on the assembled liquid lens that would cause localized pressure drops of maximum magnitude X in the absence of the stabilizing feature, the maximum magnitude of localized pressure drops within the liquid lens is smaller than X.

In one aspect, the stabilizing feature comprises a portion of the top or bottom substrate having a stiffness greater than a first threshold value.

In another aspect, the stabilizing feature comprises the top or bottom substrate having a region of reduced thickness t, forming a membrane.

In yet another aspect, the region is a circular area of radius R, and the stiffness greater than a first threshold value is achieved in part by selection of the value of R during the fabrication of the top or bottom substrate.

In one aspect, a liquid lens with improved resistance to forming an emulsion comprises a top substrate, a bottom substrate, and a central substrate including a cavity filled by first and second liquids. At least one of the top substrate and the bottom substrate is characterized by a stabilizing feature determining that in response to an impact load on the assembled liquid lens that would cause localized pressure drops of maximum magnitude X in the absence of the stabilizing feature, the maximum magnitude of localized pressure drops within the liquid lens is smaller than X.

In another aspect, the stabilizing feature comprises a portion of the top or bottom substrate having a stiffness greater than a first threshold value.

In yet another aspect the stabilizing feature comprises a region of reduced thickness T, forming a membrane.

DETAILED DESCRIPTION

The manner in which the present invention provides its advantages can be more easily understood with reference to FIGS. 1 through 6.

Figure 1:
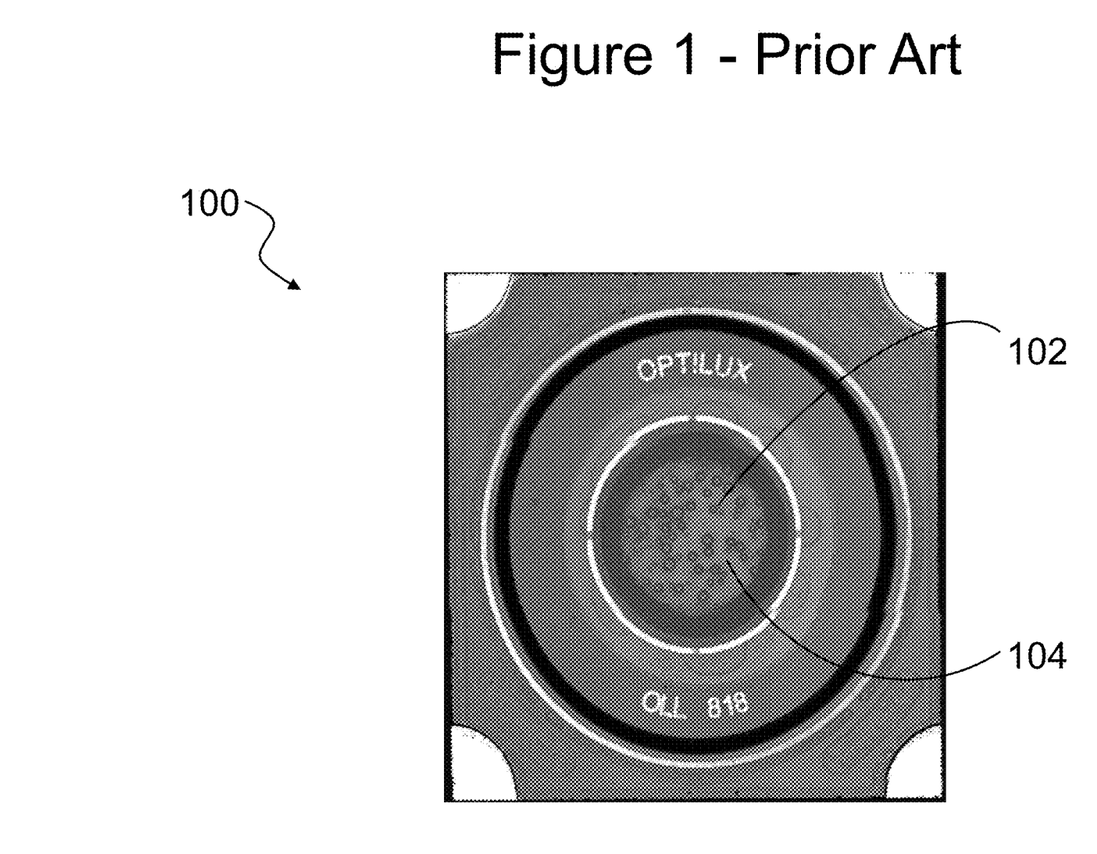
FIG. 1 illustrates a prior art liquid lens exhibiting emulsion due to repeated high shock loads.

FIG. 1 is an image of a prior art liquid lens 100 exhibiting emulsion due to repeated high shock loads. The top down view clearly shows the droplets 102 of one liquid (appearing relatively dark) suspended in the other liquid 104 (appearing relatively light) in the center of the image. The existence of an emulsion of this sort will naturally detract from the ability of the lens to respond as desired to electrode drive signals aimed at altering the curvature of a single smooth meniscus between the two liquids in an un-emulsified state.

Figure 2:
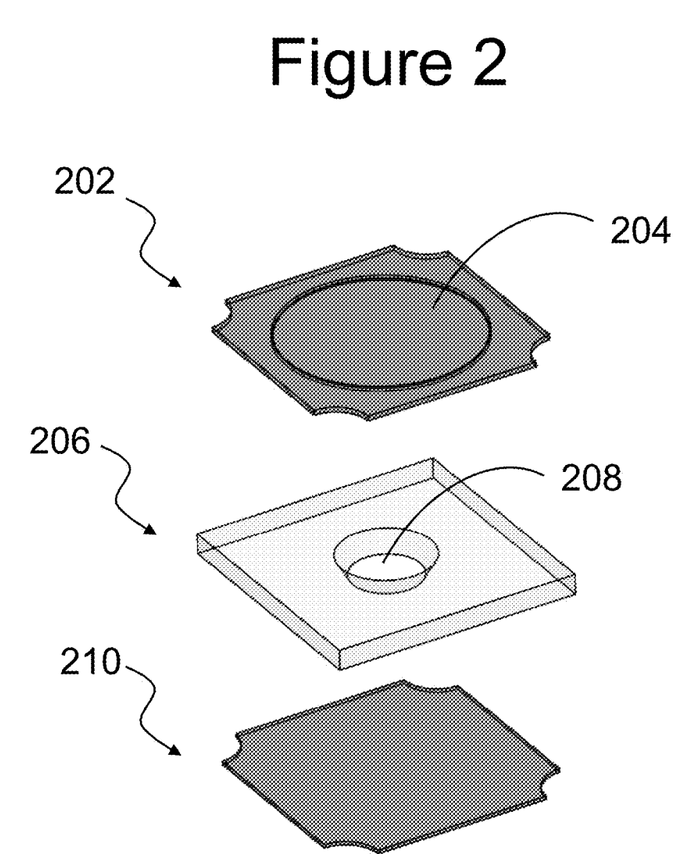
FIG. 2 illustrates an exploded view layout of top, center, and bottom substrates that may be used in a liquid lens according to one embodiment.

FIG. 2 illustrates exploded view layout showing top substrate 202, center substrate 206, and bottom substrates 210 that may be used in a liquid lens according to one embodiment. Top substrate 202 includes a region 204 of reduced thickness, forming a membrane designed to provide stabilization or protection against emulsification as will be discussed in more detail below. In the illustrated embodiment, membrane 204 is circular, but other membrane shapes may be present in other embodiments. Center substrate 206 includes a cavity 208, into which the polar and non-polar liquids (not shown) are introduced during lens assembly. In the shown embodiment, the cavity has a conical shape formed by molding the center substrate correspondingly, but other processes such as etching may be used, and other shapes may be chosen. In the assembled liquid lens, at least a portion of membrane 204 will directly overly cavity 208, which in turn will overly bottom substrate 210. The final assembled liquid lens device includes hermetic bonds, sealing the liquid mixture into the cavity bounded by the substrates. Further details of substrates 202, 206 and 210 such as the layout of electrodes, protective coating layers etc are omitted from this and other figures of the present disclosure for simplicity, but some may be found in the specifications of the above-noted patent applications while others are well known in the field.

Figure 3A:
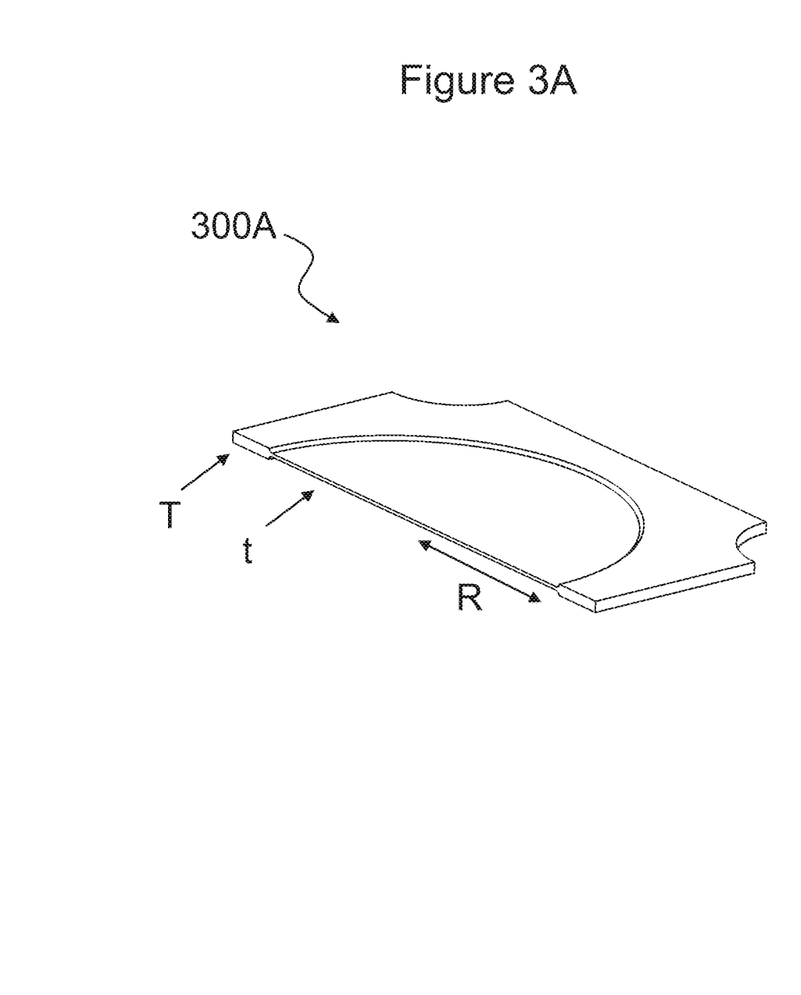
FIG. 3A illustrates a perspective cross-section view of a top substrate of a liquid lens according to one embodiment.

FIG. 3A shows a perspective cross-section view of a top substrate 300A of a liquid lens according to one embodiment. A central region of the substrate has been thinned to a thickness t, smaller than the thickness T of the surrounding region. In this embodiment, the thinned region has a circular area (only half of which is seen in this view) of radius R. The thinned region directly overlies the corresponding cavity in the final assembled liquid lens, acting as an upper boundary for the liquid mixture. In another embodiment, not shown, the thinned region may be formed into a bottom substrate instead of or in addition to the top substrate, with the thinned region directly underlying the corresponding cavity in the assembled lens.

The benefit of providing a thinned region as shown, in either the top or bottom substrate, is to allow that portion of the substrate in the final assembled liquid lens to readily deflect or bulge outwards when the temperature of the liquid lens is raised, either in pre-shipment testing or in subsequent storage, transport, or device operation. The ability of the thinned region to deflect outwards in response to increasing temperature, as shown, and in the opposite direction when the temperature falls, is a significant advantage provided by such embodiments. It allows thermal expansion and contraction to be accommodated without imposing stress on potential sites of structural failure, such as bonded joints, in the fabricated device.

Figure 3B:
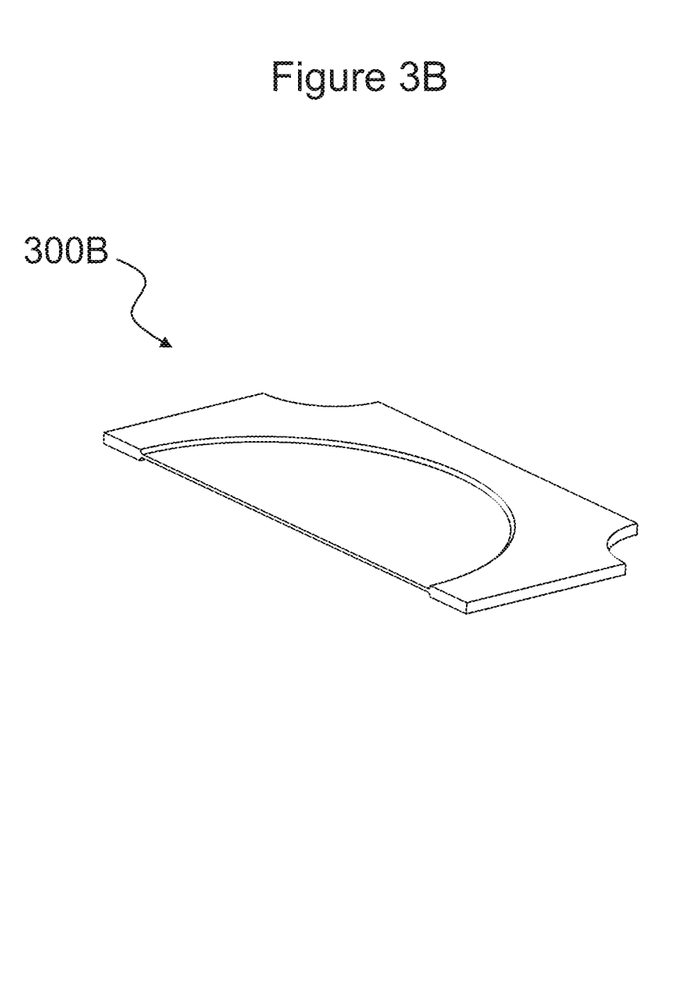
FIG. 3B illustrates a perspective cross-section view of a top substrate of a liquid lens according to another embodiment.

The thickness reduction may be achieved by etching or other means. In the embodiment of FIG. 3A, the thickness reduction has been achieved symmetrically from above and below the plane of the membrane. In the embodiment of FIG. 3B, the thickness reduction of top substrate 300B has taken entirely from one side—the lower side as shown—of the membrane, leaving the top surface planar.

The dimensions of the thinned region, specifically the thickness t and radius R determine the stiffness (and, inversely, the compliance) of the liquid lens housing formed by the bonded substrates. As discussed above, the stiffness must be low enough to accommodate thermal expansion of the fluids without fracturing the housing substrates or bond joints. For example, when the liquid lens is heated, the fluids will expand at a greater rate than the housing material and create a high internal pressure in the lens cavity. If this internal pressure becomes too high it will cause stress in the housing or bond joint that may exceed their strength and lead to a failure. However, with regard to the present invention, it has been discovered that deliberately increasing the stiffness of the housing may have the beneficial effect of preventing excessive deflections caused by an impact that may lead to a very low (or negative) pressure inside the lens cavity. Some embodiments of the present invention, such as those in FIGS. 3A and 3B, therefore tailor at least one of the top and bottom substrates to provide a thinned region with a stiffness low enough to accommodate expected thermal stresses, but high enough to also provide the desired protection against a local pressure drop inside the lens cavity caused by impact shocks.

Figure 4:
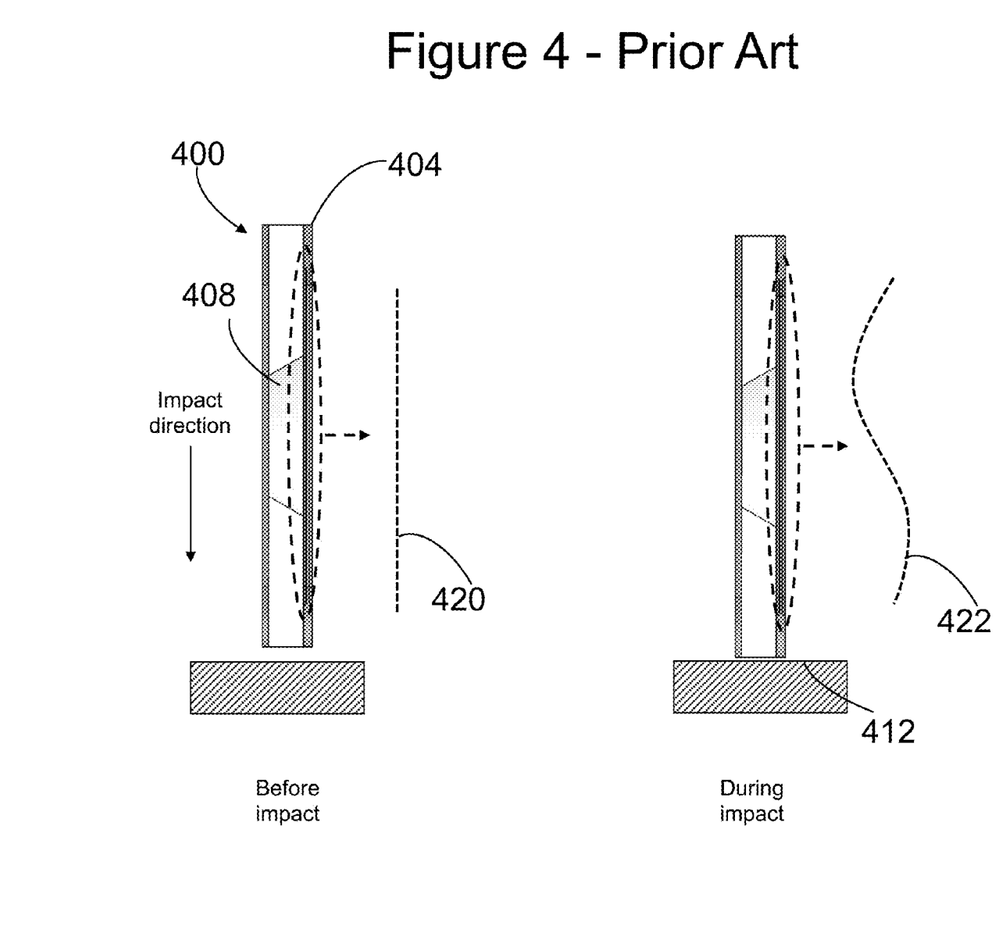
FIG. 4 illustrates deflections of the membrane of a prior art liquid lens in its resting state and during impact load.

FIG. 4 illustrates side cross-section views of a prior art liquid lens before and during a sudden impact with surface 412. The left hand side of the figure shows the resting state position of substrate 404 of liquid lens 400, with the dashed oval indicating a central region, which in some embodiments is a membrane, including the portion of substrate 402 that bounds liquid-filled cavity 408. The baseline or zero deflection of substrate 402 in that central region is indicated by the dashed vertical line 420. The right hand side of the figure shows substrate 402 during impact with surface 412. The corresponding deflections of the substrate in the central portion overlying liquid-filled cavity 408 are indicated by dashed curve 422. It should be noted that the magnitudes of the deflections are not shown to scale relative to the dimensions of substrate, but in an exaggerated form for clarity. It has been experimentally observed that during an impact from the lens being dropped onto surface 412, the substrate deflects in an outward direction (relative to the interior of the liquid lens) near the site of impact, at the bottom of the figure, and in an inward direction (relative to the interior of the liquid lens) at the opposite side of the substrate, near the top of the figure. Such deflections are accompanied by corresponding local decreases and increases respectively in liquid pressure within cavity 408, causing liquid flow, mixing, and other processes that may result in the formation of an emulsion, as discussed above.

Figure 5:
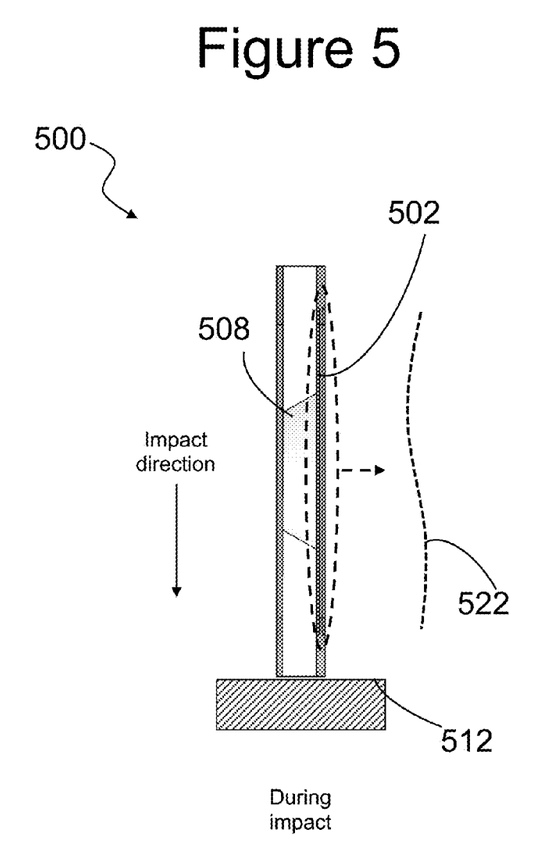
FIG. 5 illustrates deflections of the membrane of a liquid lens during impact load according to one embodiment.

FIG. 5 illustrates a side cross-section view of liquid lens 500 according to an embodiment of the present invention, during an impact of the same type and magnitude of that assumed in FIG. 4. In this embodiments, top substrate 502 is characterized by a protective or stabilizing feature, such that during an impact on surface 512, imposing a shock or impact load on liquid lens 500, the central portion of substrate 502, which may in some embodiments include a membrane, is deflected to a significantly lower extent than otherwise identical prior art liquid lenses such as lens 400 on FIG. 4. The reduced magnitudes of the deflections are indicated by dashed curve 522, shown as being relatively flattened in comparison to curve 422 of FIG. 4. The reduced substrate deflections are accompanied by correspondingly smaller pressure variations within cavity 508, more specifically to smaller localized drops in pressure, reduced liquid flow, reduced mixing, etc and a correspondingly significantly lower probability that an emulsion will be formed. In some embodiments, the bottom substrate may be characterized by a similar protective or stabilizing feature.

In many embodiments, the protective or stabilizing feature characterizing the top or bottom substrate is the stiffness. In one subset of these embodiments, the stiffness is deliberately altered by changing the substrate thickness over a prescribed area to create a membrane. The membrane, typically circular, can be formed by removing material on one or both sides of the substrate as discussed above with respect to FIGS. 3A and 3B. The amount of material removed depends on the specific lens design, but in many embodiments, the thickness of the membrane is chosen to be at least 10% less than the thickness of the remaining, bulk substrate. Typical values of T and t that have been used successfully to achieve protection against emulsification in one specific liquid lens design are 150 um and 45 um respectively.

In another subset of embodiments where the protective or stabilizing feature characterizing the top or bottom substrate is the stiffness, the stiffness is deliberately altered by changing the area over which the substrate thickness is reduced by a prescribed amount to create a membrane. In the case of a circular membrane reducing the radius, R, of the thinner section will stiffen the membrane while increasing R makes the membrane less stiff.

Figure 6A:
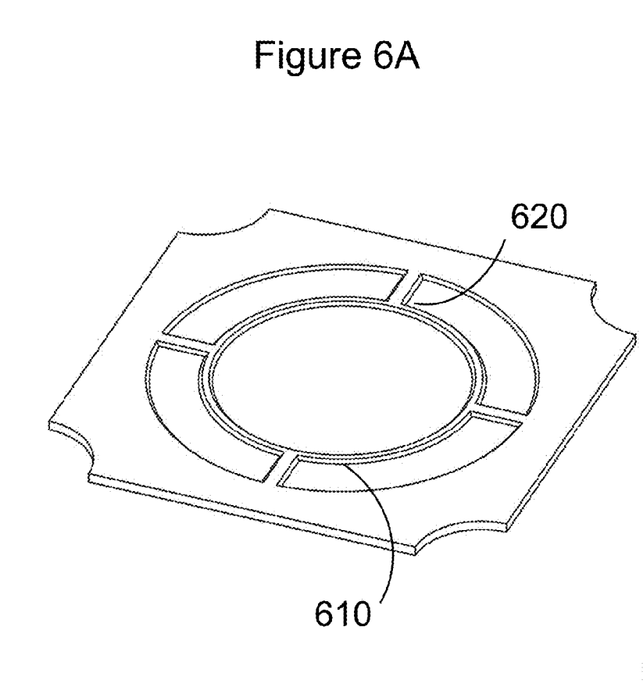
FIGS. 6A and 6B illustrate two examples of micro-stiffening elements in substrates for liquid lenses according to some embodiments.
Figure 6B:
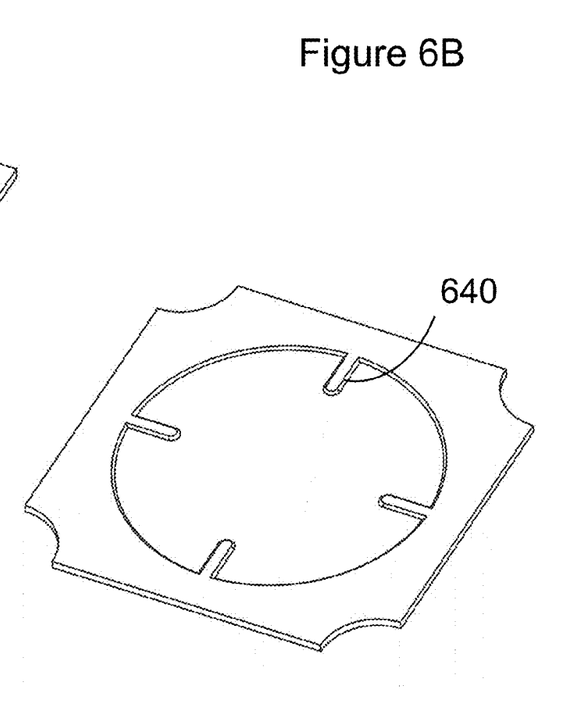

In all these embodiments, the requirement that the stiffness be low enough to accommodate expected thermal stresses may be met while concurrently ensuring that the stiffness is high enough to protect against emulsification subsequent to shock or impact loads. Localized microstiffening, for example by forming ribs into the top or bottom substrate, may be employed so that the resulting structure can withstand dynamic impact loads but nevertheless allow for large deflections under relatively static loading conditions. The ribs may be formed by etching or metallization processes prior to device assembly. FIG. 6A shows one example, in which an annular ring 610 and four bridging ribs 620 are shown. FIG. 6B shows another example, in which four cantilever ribs 640 are shown.

In some embodiments, the protective or stabilizing feature characterizing the top or bottom substrate is an inbuilt stress that is balanced by a correspondingly increased positive pressure within the liquid-filled cavity. This positive bias pressure, created in advance of any exposure of the lens to impact loads, allows the liquid lens to withstand subsequent impact load exposure without internal localized pressures dropping to levels at which the mixing and related effects discussed above leading to emulsification are likely to occur. This approach offers an extra "cushion" against emulsification at low temperatures and in devices with very thin membranes—scenarios in which the risk of emulsification might otherwise be too high.

In a subset of embodiments in which the protective or stabilizing feature characterizing the top or bottom substrate is an inbuilt stress, that stress is deliberately introduced to the top or bottom substrate by deflecting the substrate, or more typically a membrane formed in that substrate, in an outward direction relative to the liquid lens cavity during the bonding process in which the top, center and bottom substrates are bonded together to form the liquid-filled lens. In some embodiments, an external load may be applied to achieve the desired deflection. Once the bonding process is complete, the load is released and the membrane will attempt to spring back toward its equilibrium position, in turn creating a positive liquid pressure within the lens cavity. In some embodiments the application of an external load may include applying a vacuum to the external surface of the substrate during the bonding process, subsequently releasing the vacuum to achieve a positive pressure inside the lens. Alternative methods to deflect the membrane during assembly are also envisioned.

Figure 7A:
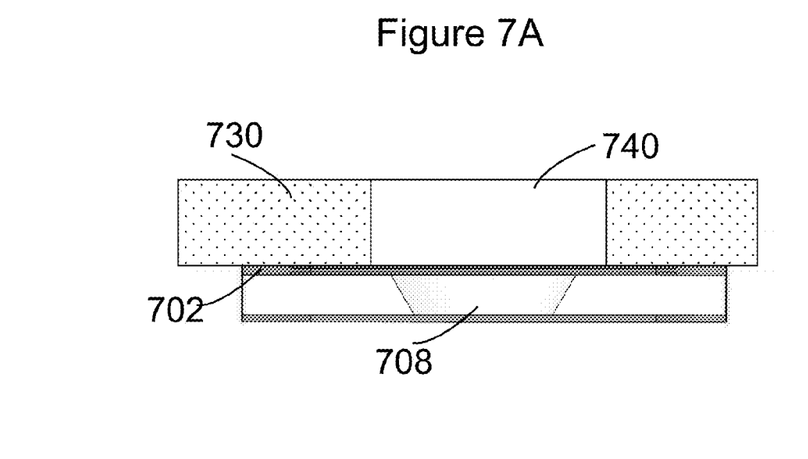
FIGS. 7A and 7B illustrate a method of introducing membrane stress and deflection during liquid lens assembly according to one embodiment.
Figure 7B:
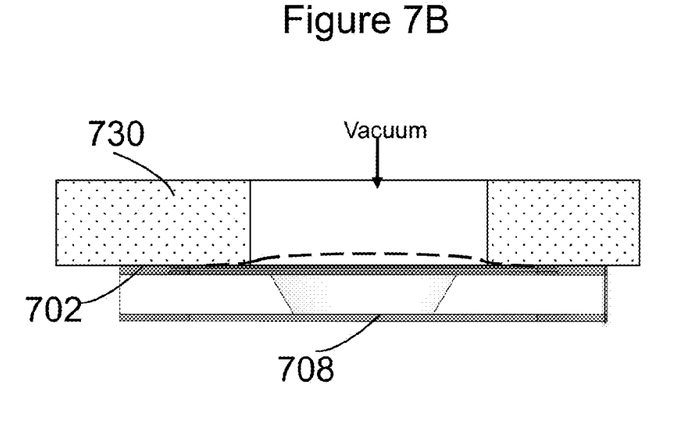

FIGS. 7A and 7B illustrate a method of introducing membrane stress and deflection during liquid lens assembly according to one embodiment. FIG. 7A shows the situation before a vacuum is applied, where flat 730 is positioned on top of the top surface of the top substrate 602, holding the stack of substrates in position for bonding to be carried out as normal. Flat 730 differs from a standard flat used in similar bonding operations in including hole 740, positioned directly over the central portion—the membrane—of substrate 702, which in turn overlies cavity 708. In FIG. 7B, a vacuum is applied through hole 740, causing the membrane (dashed line) of substrate 702 to be deflected upwards as shown (magnitude exaggerated for clarity). Liquid fill and bonding are then carried out as normal, and the vacuum released. On release of the vacuum, the convex curvature of the membrane may be reduced, but will remain present to some degree, balanced by a correspondingly increased pressure in the underlying liquid.

Embodiments described herein provide various benefits. In particular, embodiments provide for the prevention of emulsification in a liquid lens exposed to shock or impact loads. Methods used during device fabrication to achieve this prevention are not incompatible with other measures currently taken to improve device reliability, and may in fact allow for thinner membranes to be used than would otherwise be feasible, and for the device to withstand lower temperatures than would otherwise be considered safe in the context of risk of emulsification.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A method for preventing the formation of an emulsion in a liquid lens by minimizing localized internal pressure drops in response to an impact load, the method comprising:
   thinning a first region of a first substrate to form a membrane with reduced thickness compared to a remaining portion of the first substrate;
   assembling the liquid lens by bonding each of the first substrate and a third substrate to a second substrate in a stacked configuration, with the second substrate disposed between the first substrate and the third substrate, first and second immiscible liquids filling a cavity of the second substrate, at least a portion of the membrane of the first substrate overlying the cavity of the second substrate, and the membrane configured to bulge outward in response to an increase in a temperature of the first and second immiscible liquids;
   wherein thinning the first region of the first substrate comprises ensuring that a parameter of the first substrate has a value selected such that, in response to the impact load on the assembled liquid lens, localized pressure drops within the liquid-filled cavity are minimized, notwithstanding the presence of the membrane.

2. The method of claim 1 wherein the parameter is stiffness.

3. The method of claim 2 wherein the membrane extends over a circular area of radius R, and wherein the stiffness is determined in part by selection of the value of R during the fabrication of the first substrate.

4. The method of claim 2 wherein the membrane has a thickness t, and wherein the stiffness is determined in part by selection of the value of t during the fabrication of the first substrate.

5. The method of claim 1 wherein the parameter is an inbuilt stress.

6. The method of claim 5 wherein the inbuilt stress is achieved by applying an external load during the assembly of the liquid lens.

7. The method of claim 6 wherein the assembly comprises a substrate bonding step and wherein the application of an external load comprises applying a vacuum to deflect the first substrate in an outward direction relative to the liquid lens cavity during the substrate bonding step.

8. The method of claim 5 wherein the inbuilt stress is achieved by causing a deflection of a portion of the first substrate in an outward direction relative to the cavity during the assembly of the liquid lens.

9. The method of claim 1 comprising fabricating a micro-stiffening element into the first substrate, the micro-stiffening element causing a localized increase in substrate stiffness.

10. The method of claim 9 wherein the micro-stiffening element comprises a rib.

11. A liquid lens with improved resistance to forming an emulsion in response to an impact load, the lens comprising:
 a first substrate comprising a membrane defined by a thinned region of the first substrate with a lower thickness than a remaining portion of the first substrate;
 a second substrate including a cavity filled by first and second immiscible liquids; and
 a third substrate;
 wherein the second substrate is disposed between the first substrate and the third substrate such that at least a portion of the membrane of the first substrate overlies the cavity of the second substrate, and the membrane of the first substrate is configured to bulge outward in response to an increase in a temperature of the first and second immiscible liquids; and
 wherein a parameter of the first substrate has a value selected such that, in response to the impact load on the liquid lens, localized pressure drops within the liquid-filled cavity are minimized, notwithstanding the presence of the membrane.

12. The lens of claim 11 wherein the parameter is stiffness.

13. The lens of claim 12 wherein the membrane extends over a circular area.

14. The lens of claim 11 wherein the parameter is an inbuilt stress.

15. The lens of claim 14 wherein the inbuilt stress is achieved by a portion of the first or third substrate having an inbuilt curvature, convex relative to the liquid lens, in the absence of the impact load.

16. The lens of claim 11 wherein the first substrate includes a micro-stiffening element, the micro-stiffening element causing a localized increase in stiffness of the corresponding substrate.

17. The lens of claim 16 wherein the micro-stiffening element comprises a rib.

18. A liquid lens comprising:
 a first substrate comprising a central portion with reduced thickness compared to a remaining portion of the first substrate;
 a second substrate comprising a cavity formed therein and bonded to the first substrate such that the central portion of the first substrate at least partially overlies the cavity of the second substrate;
 a third substrate bonded to the second substrate such that the second substrate is disposed between the first substrate and the third substrate; and
 first and second fluids disposed within the cavity and in contact with each other to form a meniscus between the first and second fluids;
 wherein the central portion of the first substrate is configured to bulge outward in response to an increase in a temperature of the first and second fluids disposed within the cavity.

19. The liquid lens of claim 18, wherein the first substrate comprises a micro-stiffening element.

20. The liquid lens of claim 19, wherein the central portion of the first substrate is substantially circular, and the micro-stiffening element comprises a rib extending from the remaining portion of the first substrate into the central portion.

21. The liquid lens of claim 18, wherein the first and second fluids disposed within the cavity are under positive pressure resulting from an inbuilt stress in the first substrate.

22. The liquid lens of claim 18, wherein the central portion of the first substrate and the remaining portion of the first substrate are formed from the same material.

23. The liquid lens of claim 18, wherein a thickness of the central portion of the first substrate is at least 10% less than a thickness of the remaining portion of the first substrate.

24. The liquid lens of claim 18, wherein the first and second fluids are immiscible, and wherein a stiffness of the central portion of the first substrate is sufficiently low to enable deflection of the central portion in response to the increase in the temperature of the first and second fluids disposed within the cavity and sufficiently high to limit a local pressure drop within the cavity in response to an impact to a level at which there is no substantial emulsion of the first and second fluids.

* * * * *